Sept. 20, 1960     J. H. STAAK     2,953,028
STARTING ARRANGEMENT FOR INTERNAL COMBUSTION ENGINES
Filed Sept. 25, 1959
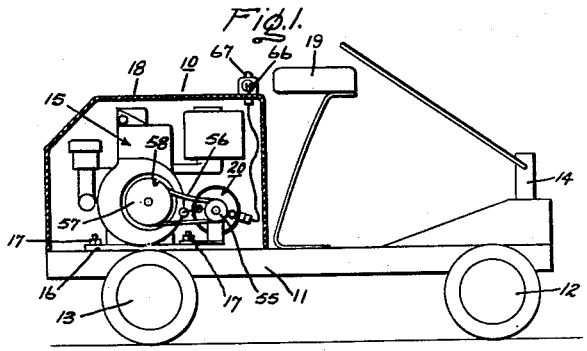
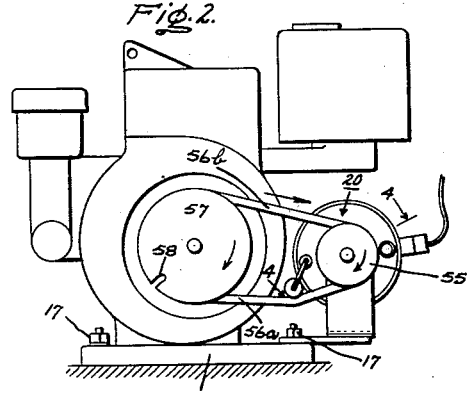
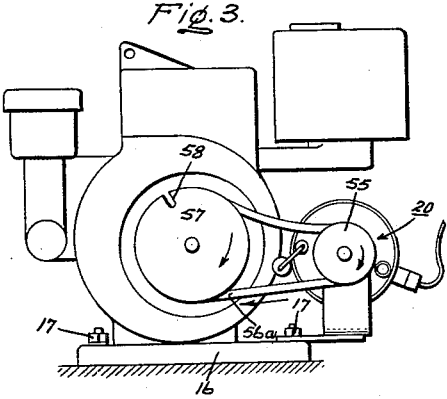
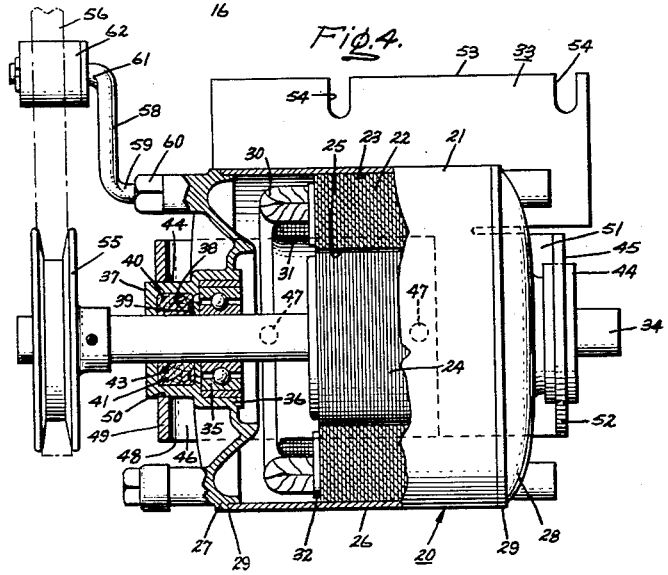
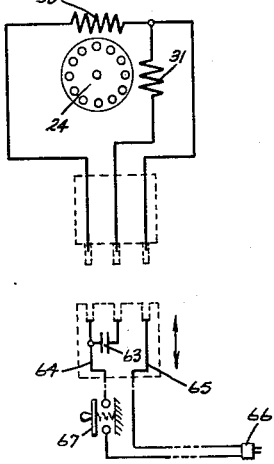
Inventor:
Julius H. Staak,
by H. F. Manbeck, Jr
Attorney.

United States Patent Office 2,953,028
Patented Sept. 20, 1960

2,953,028
STARTING ARRANGEMENT FOR INTERNAL COMBUSTION ENGINES
Julius H. Staak, Fort Wayne, Ind., assignor to General Electric Company, a corporation of New York
Filed Sept. 25, 1959, Ser. No. 842,327
4 Claims. (Cl. 74—8)

This invention relates to electric starting for internal combustion engines and more particularly to an improved arrangement for electrically starting lawn mower engines.

Many power units for lawn mowers in common use today are of the two and four cycle gasoline internal combustion engine variety which require hand type starting. The starting arrangement generally includes a length of cord or the like wrapped around a pulley assembly which, in turn, is connected to the engine fly wheel and crankshaft assembly. The lawn mower operator usually braces a foot or hand against the lawn mower while pulling the cord to turn over and start the engine. This type of starting arrangement is unsatisfactory in many respects; for instance, the strength needed for turning over and starting the engine having a hand type or cord starter usually requires that the starting operation be performed by the adult male member of the family. Moreover and more important, in recent years numerous accidents have resulted directly from the starting operation. For example, the braced foot may slip and the mower can be accidently pulled or tripped onto the foot. Another common accident is one in which the braced foot or hand slips from the lawn mower immediately after the mower engine has been started and the mower rides over one of the operator's feet before the foot can be removed from the path of the lawn mower.

Consequently, it is extremely desirable that a starting arrangement be provided which eliminates accidents incurred during the starting operation of a lawn mower engine and can be safely and easily operated by almost any member of the family. It is also important that the starting arrangement be suitable for use with a variety of lawn mower power units already available commercially. Further, it is desirable, of course, that the starting arrangement be simple in construction, relatively inexpensive and easy to attach to the already available engines.

Accordingly, it is a primary object of this invention to provide an improved electric starting arrangement for use with an internal combustion engine.

It is a further object to provide a lawn mower internal combustion engine with an improved starting arrangement which is versatile in nature, is relatively inexpensive, and is easy and safe to use.

In carrying out the objects of this invention in one form thereof, I provide a lawn mower having an internal combustion engine with an electric motor for starting the engine. The motor, which has rotor and stator members supported for relative rotation, is mounted to rotate from a de-energized position to an energized position in response to the motor torque. A frictional driving connection is provided between the rotor and the engine, and when the motor is in its energized position, a roller assembly fastened to move with the stator provides a pressure rolling engagement with driving connection to tighten it and effectively turn over the lawn mower engine. Once the engine has been started, the motor is de-energized and automatically returned to its de-energized position, thereby removing the rolling pressure engagement of the roller assembly from the driving connection and permitting the engine to operate without any interference from the motor.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:
Fig. 1 is a side view, partially in cross section, of a lawn mower embodying the preferred form of my improved starting arrangement;

Fig. 2 is an enlarged side view of the internal combustion engine and electric motor starting arrangement illustrated in Fig. 1, showing the present invention being used under starting conditions;

Fig. 3 is a similar view to Fig. 2, showing the lawn mower engine under running conditions with the electric motor in the inoperative position;

Fig. 4 is a view, partially in section, taken on line 4—4 of Fig. 2; and

Fig. 5 is a diagrammatic representation of the preferred electrical circuit utilized to energize the electric motor.

Referring now to the drawing in more detail, Fig. 1 illustrates one form of the present invention, by way of example only, as applied to a rider-controlled power driven type lawn mower, generally indicated at 10. Briefly described, the illustrated rider-type lawn mower is of standard construction having a horizontal platform or frame 11, carried in the usual way by spaced apart front and rear wheel assemblies, 12 and 13, respectively. A steering assembly 14 is mounted on the front portion of frame 11 and is operatively connected to the front wheel assembly 12 by any suitable means well known in the art (not shown). A power unit in the form of an internal combustion gasoline engine, generally denoted by numeral 15, is connected in driving relation by any well-known manner (not shown) with wheel assembly 13 and a rotatable cutting means (not illustrated). The engine 15 is formed with a horizontal base plate 16, which is secured on the rear portion of frame 11, as by a nut and bolt arrangement or engine mounting means 17 extending through the frame and base plate 16. For reasons of appearance and safety, a protector hood 18 may be fastened onto frame 11, surrounding engine 15. A seat 19 is provided in the conventional manner between hood 18 and steering assembly 14 for carrying the lawn mower operator.

With specific reference to my preferred arrangement for electrically starting the internal combustion engine 15, I utilize an alternating current induction motor of the permanent-split-phase capacitor type, generally designated at 20. As illustrated (see in particular Fig. 4), motor 20 comprises a housing assembly 21, a laminated stator core member 22 fixed to the inner peripheral wall 23 of the housing assembly 21 and a rotatable member or rotor 24 of standard construction mounted for relative rotation within the stator bore 35. For convenience in the ease of assembly, housing assembly 21 is shown as comprising a central cylindrical shell member 26, and a pair of identical cup-shaped end shield members 27 and 28 which may be secured to shell member 26 by any suitable means, such as the nut, bolt and rabbetted arrangement denoted generally by numeral 29. Main or running windings 30 and start windings 31 are disposed in winding slots (not shown) suitably provided in stator core member 22 and are electrically insulated from the stator core in the usual way, as by insulating members 32.

The motor is mounted for rotary movement of both the rotor 24 and the stator 25 relative to a stationary supporting cradle assembly 33. This is preferably accomplished in the following manner. Rotor 24 is secured, such as by keying, to a shaft 34 which is rotatably carried on opposite sides of the rotor by bearings 35 which, in turn, are mounted in the respective end shield members of the motor frame. For simplicity of illustration, only one end of the rotor and bearing assembly, with the associated supporting parts, has been illustrated in detail in Fig. 4, but it is understood that the other end of the rotor may be supported in a similar fashion. As shown, bearing 35 is fixedly secured within a substantially cylindrical bearing housing 36 formed integrally with and centrally of end shield 27.

A second housing or hub 37 is integrally formed on the end shield 27, axially beyond and adjacent to bearing housing 36, away from the stator member 22. Hub 37 provides the means for rotatably mounting stator member 22 and frame assembly 21 secured thereto relative to the supporting cradle assembly 33, as well as for a satisfactory lubricating system for lubricating the journaling surfaces of the shaft. Two radially extending internal walls 38 and 39 along with axially extending internal wall 40 define a lubricant reservoir 41 which is filled with suitable lubricant and lubricant retaining means, such as loose lubricant absorbent material 42 in direct communication with shaft surface 43. The outer peripheral surface 44 of hub 37 acts as the journaling surface for rotatably supporting motor 20 on the stationary cradle assembly 33 and is arranged co-axially with respect to the rotor shaft 34 and bearings 35.

Still referring to Fig. 4, it will be seen that cradle assembly 33 is shown as being preferably formed of two members 45 and 46, suitably held together by screw means 47 as indicated by the dotted lines. Member 45 has a horizontal base portion 48 and a vertical support portion 49 provided at one end thereof having a suitable opening 50 for receiving and journaling the outer peripheral surface 44 of hub 37. Member 46 provides a similar support at the other side of motor 20, also having a horizontal base portion 51 and a vertical support portion 52. In addition, the horizontal base portion of member 46 is furnished at its edge 53 with two spaced apart slots 54 for accommodating the bolts of the engine mounting means 17 mentioned heretofore.

The aforedescribed motor mounting construction not only will rotatably support motor 20 on the stationary cradle assembly 33, but also will permit the easy installation of motor 20 and cradle assembly 33 as a single unit onto power mowers already commercially available and in general use. For example, referring to Fig. 1, motor 20 and cradle assembly 33 may be secured to engine 15 merely by loosening the bolts of the engine mounting means 17 and sliding the motor and cradle assembly into the desired position (to be described more in detail hereinafter) before tightening the bolts.

With specific reference to Figs. 1–4 inclusive, a flexible, frictional driving connection is provided between the starting motor 20 and the lawn mower internal combustion engine 15 by a suitable pulley 55 secured to the end of rotor shaft 34, axially beyond hub 37. This pulley is connected by a belt 56 with a rotary member, such as belt pulley 57, of the device to be driven; i.e., the lawn mower engine 15. Figs. 1–3 show belt pulley 57 as being, by way of illustration only, a conventional lawn mower starting wheel having a radial slot 58 for receiving the end of the starting rope and a circumferential groove in which the rope is normally wound in order that the lawn mower operator might pull the rope for rotating the starting wheel. Pulley 57 (the starting wheel) is in turn coupled to the engine fly wheel and crankshaft assembly in a manner well-known in the art (not shown). It should be noted at this point that when motor 20 is properly mounted on engine base plate 16, the grooves of pulleys 55 and 57 will be in alignment and belt 56 will be slightly loose, as indicated in Fig. 1.

End shield 27 is furnished with the means for ensuring a frictional driving engagement between motor 20 and engine 15 during starting conditions. As illustrated in Fig. 4, the end shield is provided with an arm 58, generally Z shaped, having its inner leg 59 secured to the end shield as by a threaded engagement therewith, as at 60, and having its outer leg 61 carrying a roller 62 for a pressure rolling engagement with the inner surface of belt 56. The significance of this construction will become more apparent as the description proceeds.

Starting motor 20 may be energized in any suitable fashion, such as that shown in Fig. 5. Motor windings 30 and 31, arranged in cooperative relationship with rotor 24, are conventionally connected to provide a motor of the permanent split phase capacitor type; i.e., starting winding 31 is in parallel with the main winding 30 and in series with a suitable capacitor 63. The windings are connected through conductor lines 64 and 65 to a male plug 66 for ultimate electrical connection to a suitable alternating current source, such as provided by any standard house outlet. A suitable switch 67, illustrated as being of the push button normally open type, is placed in line 64 for closing the motor circuit.

The manner in which the preferred embodiment of my invention operates will become clear from an examination of Figs. 1, 2, 3, and 5. While the lawn mower engine 15 is at rest and the starting motor 20 is in the normal de-energized position with the driving belt 56 inoperatively slack as illustrated in Fig. 1, the starting motor may be connected by the lawn mower operator to a suitable source of power, such as by attaching a standard electrical extension cord between a house or garage electrical outlet (not shown) and plug 64, which for convenience may be secured with switch 67 as a single unit onto the lawn mower hood 18, immediately behind seat 19.

Thereafter, the button of switch 65 may be depressed by the operator to close and energize the motor circuit heretofore described. Upon energization of the starting motor 20, the resulting motor torque reacts between stator core member 22 and rotor 24. Since both the stator and rotor are mounted for relative rotation with each other as well as with the stationary cradle 33, the stator will tend to rotate in a positive direction, i.e. counterclockwise as viewed in the drawing and indicated by the arrow in Fig. 2, and the rotor will tend to rotate in the opposite or clockwise direction. Consequently, roller 62 which is fixedly fastened to the stator member 22 through the intermediaries of arm 58, end shield 27, and shell 26, will move into a rolling engagement with the inner surface of the lower portion of belt 56 (see Fig. 2). This engagement will cause the cessation of rotational movement of stator member 22 and its associated parts while the rotor 24 with its pulley 55 attached thereto is still free to rotate. The rotor, being the drive member rotating in a clockwise direction, will pull the upper belt connection somewhat taut between the driver and driven pulleys 55 and 57 respectively. In addition, the pressure exerted by roller 62 on the lower part of the belt, which would otherwise be slightly loose during rotation of the pulleys, will tighten the belt to increase the friction in the driving connection to prevent the belt from slipping. Tightening of belt 56 brings in new resistance to the rotation of rotor 24 with the net result that the motor torque is increased, further tightening the belt. Thus, when the starting motor 20 is energized, belt 56 will be effectively tensioned from an inoperative slack position (Fig. 1) to an operative taut position (Fig. 2) thereby automatically and efficiently driving the driven pulley 57 which in turn, will "crank" and start operation of the lawn mower engine 15.

As soon as the engine has been started, the operator may release the pressure on the switch button to de-energize the motor circuit. Once the engine becomes the driver member and the motor circuit has been de-energized, the motor torque is destroyed and the bottom part of belt 56 will tend to become taut without the aid of roller 62 since the driving connection between the pulleys will be through the bottom part of the belt. The motor, no longer being energized and being rotatably mounted with respect to the stationary cradle assembly 33, will in effect be kicked back to its initial position illustrated in Fig. 1 by the resulting reaction between belt 56 and roller 62. In this position, the arm 58 and roller 62 will be out of contact with the revolving belt 56 and the rotor, which is freely and rotatably mounted, will be driven by engine pulley 57. However, due to its freedom of rotation, the rotor 24 will not interfere in any way with the proper operation of the lawn mower (see Fig. 3).

In practicing my invention, it will occur to those skilled in the art that a battery and a D.C. series motor could be employed in place of the alternating current starting motor of the preferred embodiment with equally effective results.

It will be readily apparent from the foregoing that the advantages of the present invention are manifold. The electric motor unit of my improved starting arrangement is simple in construction, inexpensive to produce, and easy to install on existing lawn mowers. Further, and even more important, the starting operation not only is capable of being performed by any member of the family using the lawn mower, but also accidents heretofore attributed to the starting operation can be eliminated.

It should be apparent to those skilled in the art, while I have shown and described what at present is considered to be the preferred embodiment of my invention in accordance with the patent statutes, changes may be made in the structure disclosed (it is to be understood that modifications can be made) without actually departing from the true spirit and scope of this invention, and I therefore intend to cover in the following claims all such equivalent variations as fall within the invention.

What I claim as new and desire to secure by Letters Patent of the United States is:

1. In a lawn mower having an internal combustion engine for driving said mower, said engine having a rotary member for applying starting torque to said engine, an electric motor for starting said engine, said motor having a rotor and a stator, stationary mounting means rotatably carrying said stator and said rotor on a fixed axis spaced a predetermined distance from the axis of said rotary member of the engine, said stator having a de-energized position and turning on said fixed axis to an energized position upon energization of said motor, a frictional driving connection means between said rotor and said rotary member of said engine, roller means fastened to said stator for providing a rolling pressure engagement with said driving connection means when said stator is in its energized position to increase the effectiveness of the driving connection, said stator including said roller means being rotated reversely about said fixed axis to said de-energized position by said driving connection means when said engine drives said driving connection means after the starting thereof.

2. In a lawn mower having an internal combustion engine for driving said mower, said engine having a rotary member for applying starting torque to said engine, an electric motor for starting said engine, said motor having a rotor and stator, stationary mounting means rotatably carrying said rotor and said stator on a fixed axis spaced a predetermined distance from the axis of said rotary member of the engine, a driving connection means having a belt connecting said rotor with said rotary member of said engine, said stator having a de-energized position with the belt relatively slack and turning on said fixed axis to an energized position in reactive response to the motor torque, means for tightening said belt when said stator is in its energized position to increase the effectiveness of the driving connection, said latter means having a roller member fastened to said stator for movement therewith, said belt tightening means being thrown out of engagement with said belt when said engine drives said belt whereby said stator is rotated reversely about said fixed axis to its de-energized position after the starting of said engine.

3. In a lawn mower having an internal combustion engine for driving said mower, said engine having a rotary member for applying starting torque to said engine, an electric motor for starting said engine, said motor comprising a shaft, a rotor secured to said shaft, a stator, and a frame assembly fixedly secured to said stator and having means for rotatably supporting said rotor relative to said stator, stationary means for supporting said frame assembly for rotation on a fixed axis spaced a predetermined distance from the axis of said rotary member of the engine, a frictional driving connection means comprising at least one pulley and a belt for connecting said rotor with said rotary member of said engine, said stator having a de-energized position with the belt relatively slack and turning on said fixed axis to an energized position in reactive response to the motor torque, means for tightening said belt when said stator is in its energized position to increase the effectiveness of the driving connection, said latter means comprising an arm secured to said frame assembly for movement therewith and a roller member rotatably carried by said arm for providing a rolling pressure engagement with said belt when said frame assembly is in energized position, said belt tightening means being shown out of engagement with said belt when said engine drives said belt whereby said stator is returned to its de-energized position and said rotor is freely rotatable offering no interference to the operation of said engine after the starting thereof.

4. A lawn mower having an internal combustion engine for driving said mower, said engine having a rotary member for applying starting torque to said engine, an electric motor for starting operation of said engine, said motor comprising a shaft, a rotor secured to said shaft, a stator, and a frame assembly secured to said stator and having means for supporting said rotor and said stator for relative rotation, said frame assembly having a hub portion disposed at either end thereof, each hub portion having a journaling surface formed on its outer periphery, a stationary support for receiving and journaling each hub portion on a fixed axis spaced a predetermined distance from said engine, a frictional driving connection means including a rotary member, a belt for operatively connecting said rotor with said engine rotary member, said stator having a de-energized position with the belt relatively slack and turning on said fixed axis to an energized position in reactive response to the motor torque, means for tightening said belt when said stator is in its energized position to increase the effectiveness of the driving connection, said latter means comprising an arm secured to said frame assembly for movement therewith and a roller member rotatably carried by said arm for providing a rolling pressure engagement with said belt when said frame assembly is in energized position, said belt tightening means being thrown out of engagement with said belt when said engine drives said belt whereby said stator is rotated reversely about said fixed axis to its de-energized position and said rotor is freely rotatable offering no effective interference to the operation of said engine after the starting thereof.

References Cited in the file of this patent

UNITED STATES PATENTS

| | | |
|---|---|---|
| 1,304,252 | Bijur | May 20, 1919 |
| 2,237,555 | Haskell | Apr. 8, 1941 |
| 2,594,674 | Nietfeld | Apr. 29, 1952 |
| 2,897,677 | Wood | Aug. 4, 1959 |